United States Patent [19]
McCoy

[11] 4,304,532
[45] Dec. 8, 1981

[54] PUMP HAVING MAGNETIC DRIVE

[76] Inventor: Lee A. McCoy, 2605 Garfield St., San Mateo, Calif. 94403

[21] Appl. No.: 104,545

[22] Filed: Dec. 17, 1979

[51] Int. Cl.³ ............................................ F04D 13/02
[52] U.S. Cl. ..................................... 417/420; 310/104
[58] Field of Search ...................... 417/420; 64/28 M; 192/84 PM; 310/104

[56] References Cited

U.S. PATENT DOCUMENTS

| | | | |
|---|---|---|---|
| 2,669,668 | 2/1954 | Okulitch et al. | 417/420 X |
| 3,299,819 | 1/1967 | McCoy | 417/420 |
| 3,420,184 | 1/1969 | Englesberg | 417/420 |
| 3,512,901 | 5/1970 | Law | 417/420 X |

Primary Examiner—Richard E. Gluck
Attorney, Agent, or Firm—T. R. Zegree

[57] ABSTRACT

A fluid-handling apparatus having a magnetic drive comprises a rotatable driver member and a driven member provided with blades for imparting motion to a fluid and mounted on a stationary shaft forming a one-piece unit with a thin diaphragm positioned between said two members which comprise a plurality of permanent magnets. Each magnet has a central aperture dimensioned so that the attracting force is substantially equal throughout the body of the magnet.

9 Claims, 5 Drawing Figures

U.S. Patent    Dec. 8, 1981    4,304,532
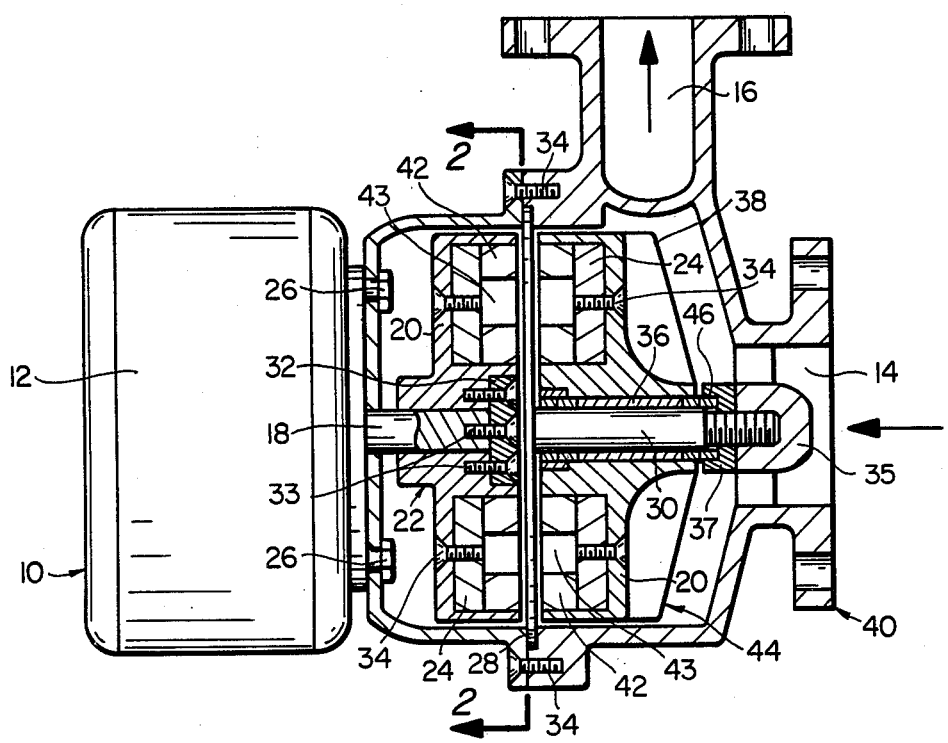
FIG_1
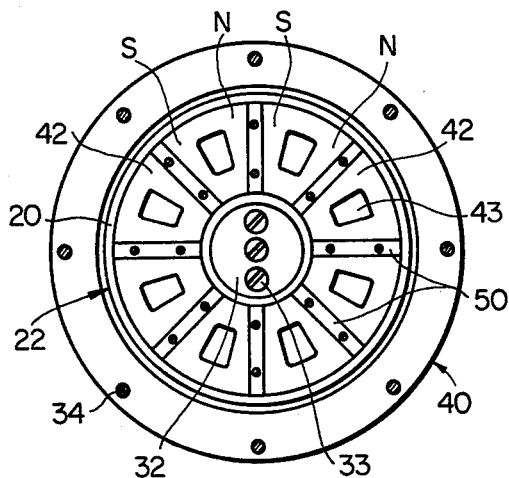
FIG_2
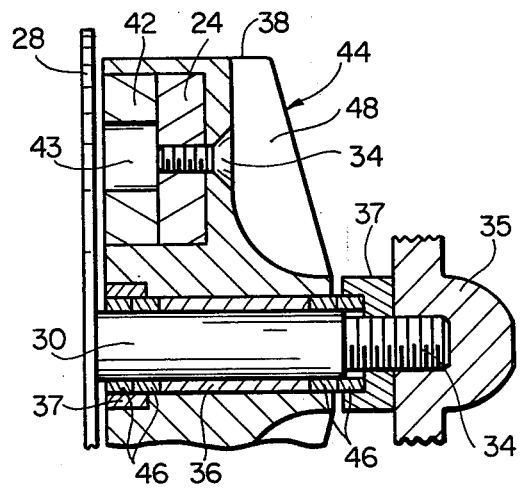
FIG_6
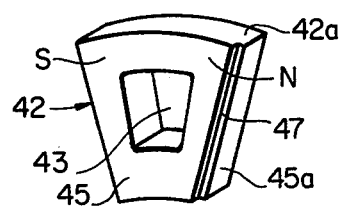
FIG_3
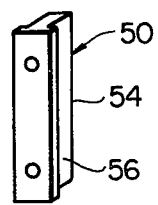
FIG_4
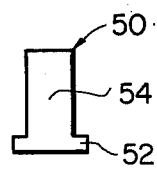
FIG_5

PUMP HAVING MAGNETIC DRIVE

BACKGROUND OF THE INVENTION

The present invention relates to a fluid-handling apparatus. More particularly, the invention relates to a magnetically driven fluid-handling apparatus, such as a hydraulic pump, a compressor or the like adapted for use in delivering various fluids or slurries, including corrosive chemical liquids, at high or low pressures.

In my U.S. Pat. No. 3,299,819, I have disclosed a magnetic drive for a fluid-handling apparatus comprising a diaphragm which separates the magnetic driver member from the driven member by being fixedly mounted therebetween and secured to the housing by means of screws. A thrust bearing mounted on the electric motor shaft provides a support for the diaphragm while preventing its contact with the drive shaft. A plurality of radially extending solid magnets is secured to the driver and driven members by means of individual screws.

Various other types of magnetically driven pumps or the like devices have been described in the patent literature. For example, U.S. Pat. No. 3,941,517 describes a magnetic hydraulic pump having a pair of magnets placed in opposed relation to each other whereby the rotation of the rotor may be stopped automatically when excessive load is applied thereto. U.S. Pat. No. 3,172,364 teaches a centrifugal pump having ring magnets of conventional construction having alternating poles and magnetically coupled to each other. The magnets are positioned in closely spaced relation to each other and to a wall between them, the wall having a centrally disposed bushing which is integral with a stationary shaft. A driven shaft is mounted for rotation on the stationary shaft. U.S. Pat. No. 2,669,668 discloses a magnetically driven centrifugal pump having a non-magnetic wall dividing two chambers of the housing and carrying stub axles which act as supports for two rotating members. The driving and driven rotors include a series of U-shaped magnets fitted into pockets in the rotors and secured by studs and bolts.

While these and other prior art patents disclose concepts of pumps actuated by various types of drives, the device of this invention provides a new approach to the structure of magnetically driven pumps and the like which has certain advantages over the prior devices.

Accordingly, it is the main object of this invention to provide an improved magnetically driven fluid-handling apparatus characterized by having increased torque.

Another object of this invention is to provide a fluid-handling apparatus comprising a magnetic drive characterized by high magnetic flux that is particularly suitable for pumps coupled with a motor of relatively high horse power and designed to provide a high output.

A further object of the present invention is to provide a highly efficient in performance, heavy-duty fluid-handling apparatus suitable for delivery of corrosive liquids, wherein the apparatus is of a simpler construction and less expensive and more economical to operate than similar devices of the prior art.

BRIEF SUMMARY OF THE INVENTION

These and other objects of this invention will become more fully apparent from the following description taken in conjunction with the accompanying drawing.

In accordance with the invention, there is provided an improved fluid-handling apparatus, such as a pump or a compressor or the like which is driven by an electric motor and comprises, in combination therewith, a housing having a fluid chamber with an inlet port and an outlet port communicating therewith. A magnetic drive is comprised of a rotatable driver member and a driven member, the driver member being mounted on a drive shaft coupled with the electric motor for transmitting rotation to the driven member. A second shaft is fixedly mounted on the housing coaxially with the drive shaft, the driven member being mounted thereon for synchronous rotation with the driver member. The driven member is provided with an impeller having blade means for imparting motion to a fluid being handled while in the interior of the fluid chamber. Both the driver member and the driven member comprise a plurality of permanent segmental magnets which are mounted in an annular disc-type configuration together with spacer bar elements which fill a radial gap between each pair of adjacent magnets positioned in both members. A diaphragm located at a predetermined distance between the driver and driven members in close proximity thereto separates the fluid chamber from the portion of the housing containing the driver member to keep the fluid to be handled within the confines of the fluid chamber without leaking into the portion of the housing containing the driver member. Each magnet forming a part of both the driver and driven members is provided with an aperture in the central portion thereof. The aperture is shaped and dimensioned in such a way that the attracting force of the magnet is distributed substantially equally throughout the solid body thereof thereby providing a greater efficiency of the magnetic drive.

BRIEF DESCRIPTION OF THE DRAWING

The invention will now be more fully described with reference to the accompanying drawing wherein:

FIG. 1 is a cross sectional plan view of the invention;

FIG. 2 is a sectional view taken along the line 2—2 of FIG. 1;

FIG. 3 is a perspective view of a magnet of this invention;

FIG. 4 is a perspective view of a spacer bar element;

FIG. 5 is a top view of a spacer bar element; and

FIG. 6 is an enlarged partial sectional view of the driven member together with the diaphragm.

DETAILED DESCRIPTION OF THE INVENTION

Referring now to the drawing, wherein similar reference characters designate corresponding elements, a fluid-handling apparatus, such as a hydraulic pump, is illustrated in FIG. 1 with the drive electric motor 10 mounted in housing 12 therefor. Another housing 40 containing driver member 22 and driven member 44 comprising impeller 38 is formed of two sections joined by machine screws 34. The housing 40 is provided with inlet 14 into which a fluid is introduced into the apparatus at a relatively low pressure and discharged through outlet 16 at a relatively high pressure. A rotary drive shaft 18 of motor 10 imparts rotation of the magnetic driver member 22 which is mounted thereon. The driver member 22 comprises a magnet and pole piece carrier 20 of circular configuration which is fixedly attached to pole piece 24 by means of bolts or screws 34. The magnet and pole piece carrier 20 includes a centrally located hub of a size sufficient to slide the drive shaft 18 therethrough. A coupling lock plate 32 is likewise mounted on shaft 18 at the free end thereof. The lock plate 32 is fixedly secured to the drive member assembly by three screws 33 substantially equally spaced from each other, the centrally positioned screw being driven into the center of shaft 18 while the two other screws are driven into the magnet and pole piece carrier 20. The driver member 22 further includes a plurality of permanent segmental magnets 42 made of a suitable magnetic material, such as ferrite, as shown in greater detail in FIGS. 2 and 3 and a corresponding number of T-shaped spacer bar elements 50 shown in FIGS. 4 and 5, both of which will be described later on.

The housing 40 is fabricated from a non-magnetic, corrosion-resistant material, such as aluminum, titanium, Monel metal or the like, and comprises inlet 14 and outlet 16 for a liquid to be pumped and a stationary diaphragm 28 which constitutes a one-piece element with a stationary shaft 30 for the impeller 38, as illustrated in FIGS. 1 and 6. Thus the diaphragm 28 which is fabricated from the same material as shaft 30 forms one inseparable per therewith. The diaphragm 28 extends longitudinally in housing 40 and provides a hermetic partition between the fluid chamber and the other portion of the housing containing the driver member 22 thus dividing the housing 40 into two separate sections. To prevent any leakage of a fluid passing through the fluid chamber, the outer edge of the diaphragm 28 is snugly fitted into an O-ring provided in the inner wall of housing 40, the shape and dimension of the O-ring being such that a static seal is achieved between diaphragm 28 and the inner wall of the housing 40. The diaphragm 28 is constructed and dimensioned so that it remains inflexible during pumping action of the apparatus in spite of the fact that it is relatively thin. For example, a diaphragm having a uniform thickness of $\frac{1}{8}$ inch and a diameter of $9\frac{3}{4}$ inches is very satisfactory when it is made in conjunction with a shaft of about $\frac{3}{4}$ inch diameter. It will be appreciated that the diaphragm fabricated as a unitary element with the shaft in accordance with the invention exhibits an increased structural strength and greater resistance against the pressure built up by a fluid passing under pressure through the apparatus, as compared to a diaphragm welded to the shaft or separately affixed to the housing by a fastening means, such as a set of screws, and supported by a thrust bearing mounted on a drive shaft.

The stationary shaft 30 is fastened firmly to a web 35 in the central portion thereof by means of a suitable machine screw 34. The web 35 is cast from the same material as housing 40 and forms an integral part therewith.

The driven member 44 which is of a similar structure than the driver member 22 is composed of three essential elements, i.e. the impeller 38, the pole piece 24 and a number of segmental magnets 42 together with spacer elements 50 arranged in the same manner as in drive member 22. The impeller 38 which is secured to pole piece 24 by a set of screws equally spaced around the perimeter of the impeller comprises a plurality of blades 48. It is driven rotationally around the axis of shaft 30 and is mechanically connected to pole piece 24 by a set of screws. The driven member which is caused to rotate by magnetic attraction of the rotating drive member 22 is supported on the shaft 30 by means of conventional bushing means 36, the adjacent thrust washers 46 and thrust washer retainers 37 which permit the desired smooth rotation of driven member 44 at a high speed around the stationary shaft 30 synchronously with driver member 22 during operation of the fluid-handling apparatus.

As shown in FIGS. 2 and 3, each magnet 42 is constructed with a transversal unobstructed aperture 43 located in the central portion thereof thereby providing a solid body portion 42a which is magnetically polarized substantially uniformly throughout its thickness. Each magnet 42 has interfaces constituting the respective north and south poles designated N and S, as illustrated. As stated previously, magnets 42 are arranged radially on both the driver member 22 and the driven member 44 in an annular configuration. The space between two adjacent magnets is filled by a T-shaped spacer bar element 50 which will be described hereinafter. The polar face of each magnet directly faces the opposite polarity face of the contiguous magnet on the same disc surface thereby creating a magnetic field with that pole, as shown in FIG. 2.

To achieve an increased and most efficient magnetic flux transmission each aperture 43 is so dimensioned that the attracting force is substantially the same throughout the body of the magnet. Such uniform distribution of the magnetic force can be attained by providing, for example, a segmental magnet 42, as shown in FIG. 3, which is about 2 inches long, 2 inches wide at the top and $\frac{3}{4}$ inch wide at the bottom, the distance between the perimeter around the aperture 43 and the outer edge of the top or side walls of the magnet being approximately $1\frac{1}{2}$ and that between the bottom edge of the magnet about $1\frac{5}{8}$ inch. The weight of such magnet or of a magnet of somewhat different design will be about 15% to 50% less, preferably 20% to 30% less, than the weight of a comparable magnet without central aperture therein. Although magnets of various designs or shapes, including square, rectangular, oval or round contours may be employed satisfactorily in the practice of this invention, the tapered form with an arcuate top wall, a straight bottom wall and a pair of inwardly sloping side walls which are further apart adjacent the top wall as shown in FIG. 3 is preferred. However, regardless of the form of the magnet, it is essential for the most efficient operation of the apparatus that the central opening in the magnet be of similar configuration that the outer perimeter of the magnet and be dimensioned proportionately as indicated hereinabove to insure uniformity of magnetic flux throughout the body of the magnet. The outstanding advantage of the magnet described herein is that its flux and break-away torque are significantly increased by as much as fivefold as compared to the same characteristics of an identical magnet but with no aperture therein.

Each sloping side of magnet 42 is provided with a narrow notch 47 extending longitudinally from top to bottom at the edge of magnet's face, each notch 47 being adapted specifically to receive a side protrusion 52 of the T-shaped spacer bar element 50, such protrusion being of such size and shape to fit the entire area of notch 47. The side wall 56 of leg portion 54 of T-shaped spacer bar element 50 is of the same size as the side wall 45a of each magnet 42 and by following the contour of notch 47, it adheres snugly to side walls 45a of two adjacent magnets thus filling the space therebetween and providing support therefor. The spacer element 50 is fabricated from a non-magnetic material, such as a rigid plastic, aluminum, hard fiberboard or the like and is secured to pole piece 24 by screws.

The magnets 42 placed freely on the surface of driven member 44 and held in place by spacer elements 50 and by attracting force to pole piece 24 to preclude their displacement are protected from being in contact with a corrosive fluid to be handled by a thin membrane (not shown) of a non-magnetic material which, conveniently, may be the same material as employed in the manufacture of the housing of the apparatus or of the impeller, such as titanium or any other metal or alloy resistant to corrosion.

The pole piece 24 referred to hereinabove, which is fabricated from a suitable high-grade ferromagnetic material having low carbon and low sulfur content, such as boiler plate type steel, is fixedly secured to the rear side of the magnets 42 opposite the diaphragm 28 merely by mutual magnetic attraction. It is significant to note that the magnetic force produced by magnet 42 in combination with pole piece 24 is substantially increased as compared to a magnet structure without a pole piece. Accordingly, a greater efficiency of the magnetic assembly of this invention is achieved with a pole piece included therein.

In operation of one embodiment of the invention, i.e. an end-suction hydraulic pump, a fluid fed by suction through inlet 14 is impelled by centrifugal force created by blades 48 of rotating impeller 38 and is discharged outwardly at a high pressure through outlet 16. As mentioned earlier, driver member 22 actuated by motor 10 imparts rotary movement by magnetic force transmitted to driven member 44 mounted on stationary shaft 30. It should be noted that the sturdy single-piece construction of the shaft 30 and diaphragm 28 permits elimination of a thrust bearing required in apparatus of prior art to prevent possible rupture of the diaphragm and offers a substantially increased resistance to pressure. The unique construction of a thin but rigid diaphragm of this invention permits mounting of both driver and driven magnetic members in close proximity to their respective opposing surfaces thus resulting in an efficient flux transmission. It should also be noted that the simplified structure of the apparatus according to the invention does not require any seals or packing glands between the shafts and the rotary members thus eliminating mechanical friction therebetween and consequently producing substantial savings in energy requirements in the operation of the apparatus.

It will be apparent from the foregoing description that I have devised an improved heavy-duty magnetically driven hydraulic pump or the like fluid-handling apparatus which is useful for delivery of various fluids, particularly highly corrosive chemical solutions, as well as liquid slurries containing suspended fine solid particles, cellulosic pulp slurries, mineral slurries, aqueous sewage, etc. under high load conditions with an output in excess of 500 gallons per minute when equipped with a high-powered electric motor of 100 HP or more. An important feature of the present invention resides in an improved and simplified construction of the magnetic drive and diaphragm assembly which gives, as a result, a significant increase in the efficiency of the operation of the apparatus accompanied by a substantial reduction of power consumption which is of utmost importance especially in large-scale industrial installations during the current energy crisis.

It will be understood that various modifications in the form of this invention as herein described in its preferred embodiment may be made without departing from the spirit thereof or the scope of the claims which follow.

I claim:

1. In a fluid-handling apparatus including, in combination, an electric motor and a housing having a fluid chamber, an inlet port and an outlet port communicating therewith, a magnetic drive comprising a rotatable driver member and a driven member, said driver member being mounted on a drive shaft of said electric motor for transmitting rotation to said driven member, a second shaft fixedly mounted on said housing coaxially with said drive shaft, said second shaft having mounted thereon said driven member for synchronous rotation with said driver member, said driven member comprising an impeller having blade means for imparting motion to a fluid being handled, said driver member and said driven member comprising a plurality of segmental magnets mounted radially in an annular configuration, a diaphragm positioned between said driver member and said driven member separating said fluid chamber from the portion of said housing containing said driven member to keep said fluid within said fluid chamber, the improvement wherein each of said magnets is provided with an aperture in the central portion thereof and comprises a pair of inwardly sloping side walls, said side walls being provided with longitudinal notches extending at the edge of a face of each of said magnets, each of said apertures being of substantially similar configuration to the outer perimeter of each of said magnets.

2. The apparatus of claim 1 wherein said diaphragm and said second shaft are fabricated from a single piece of a material as a unitary element having an inseparable structure.

3. The apparatus of claim 1 including a pole piece disposed on each side of the diaphragm, each pole piece being attached to the sides of said magnets remote from said diaphragm.

4. The apparatus of claim 3 wherein said driver member includes a magnet and pole piece carrier of circular configuration secured to said pole piece.

5. The apparatus of claim 4 wherein a coupling lock plate is mounted on the end of said shaft of said electric motor and fixedly secured to said shaft and to said magnet and pole piece carrier by three screws substantially equally spaced from each other.

6. The apparatus of claim 1 wherein the weight of each of said magnets is from about 15% to about 50% less than the weight of the same magnet without said aperture.

7. The apparatus of claim 1 wherein the weight of each of said magnets is from about 20% to about 30% less than the weight of the same magnet without said aperture.

8. The apparatus of claim 3 wherein said pole piece is formed of a magnetic material and is attached to said magnets by magnetic attraction.

9. The apparatus of claim 1 wherein a non-magnetic T-shaped spacer bar element is radially disposed between each pair of said magnets thereby filling space therebetween and holding said magnets in place.

* * * * *